(12) United States Patent
Zhou et al.

(10) Patent No.: US 11,305,413 B2
(45) Date of Patent: Apr. 19, 2022

(54) HOOK HOLDER FOR A MACHINE TOOL

(71) Applicant: HILTI AKTIENGESELLSCHAFT, Schaan (LI)

(72) Inventors: Xi Zhou, Kaufering (DE); Günter Haas, Kaufering (DE); Konstantin Baxivanelis, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 265 days.

(21) Appl. No.: 16/630,319

(22) PCT Filed: Jul. 18, 2018

(86) PCT No.: PCT/EP2018/069504
§ 371 (c)(1),
(2) Date: Jan. 10, 2020

(87) PCT Pub. No.: WO2019/020456
PCT Pub. Date: Jan. 31, 2019

(65) Prior Publication Data
US 2020/0164499 A1    May 28, 2020

(30) Foreign Application Priority Data
Jul. 28, 2017    (EP) ..................................... 17183670

(51) Int. Cl.
*F16M 1/00* (2006.01)
*B25H 3/00* (2006.01)
(Continued)

(52) U.S. Cl.
CPC ............... *B25H 3/006* (2013.01); *B25F 5/02* (2013.01); *F16B 45/00* (2013.01); *F16M 13/022* (2013.01)

(58) Field of Classification Search
CPC ............ B25H 3/006; B25F 5/02; F16B 45/00; F16M 13/022
(Continued)

(56) References Cited

U.S. PATENT DOCUMENTS

| | | | |
|---|---|---|---|
| 2005/0072822 A1* | 4/2005 | Stotts | A45F 5/021 224/269 |
| 2006/0022002 A1* | 2/2006 | Marks | A45F 5/00 224/268 |
| 2015/0040408 A1* | 2/2015 | Francis | B23Q 13/00 30/388 |

FOREIGN PATENT DOCUMENTS

| | | |
|---|---|---|
| DE | 19906680 A1 | 8/2000 |
| EP | 1645372 A1 | 4/2006 |
| GB | 2347884 B | 4/2001 |

OTHER PUBLICATIONS

International Search Report of PCT/EP2018/069504, dated Oct. 23, 2018.

* cited by examiner

*Primary Examiner* — Todd M Epps
(74) *Attorney, Agent, or Firm* — Davidson, Davidson & Kappel, LLC

(57) ABSTRACT

A holding apparatus for being detachably attached to a machine tool housing of a machine tool and for receiving a hook for hanging the machine tool from the hook is provided. The holding apparatus has a fastening portion for fastening the holding apparatus to the machine tool housing, a securing device for securing the holding apparatus on the machine tool housing, and a receiving portion which has an opening and is intended for receiving and rotatably supporting an insertion portion of the hook, the receiving portion defining an axial direction. The fastening portion has a first interlocking connector to engage with a first mating inter-
(Continued)

locking connector provided on the machine tool housing, the interlocking connection between the first interlocking connector and the first mating interlocking connector allowing movement of the holding apparatus in a sliding direction and preventing movement perpendicular to the sliding direction, and in that the securing device can be moved between an open position and a locked position, the securing device being designed to prevent the holding apparatus from moving in the sliding direction in the locked position and to allow movement in the open position.

10 Claims, 6 Drawing Sheets

(51) Int. Cl.
　　*B25F 5/02*　　　　(2006.01)
　　*F16B 45/00*　　　(2006.01)
　　*F16M 13/02*　　　(2006.01)
(58) Field of Classification Search
　　USPC .............................. 248/674, 637, 307, 304
　　See application file for complete search history.

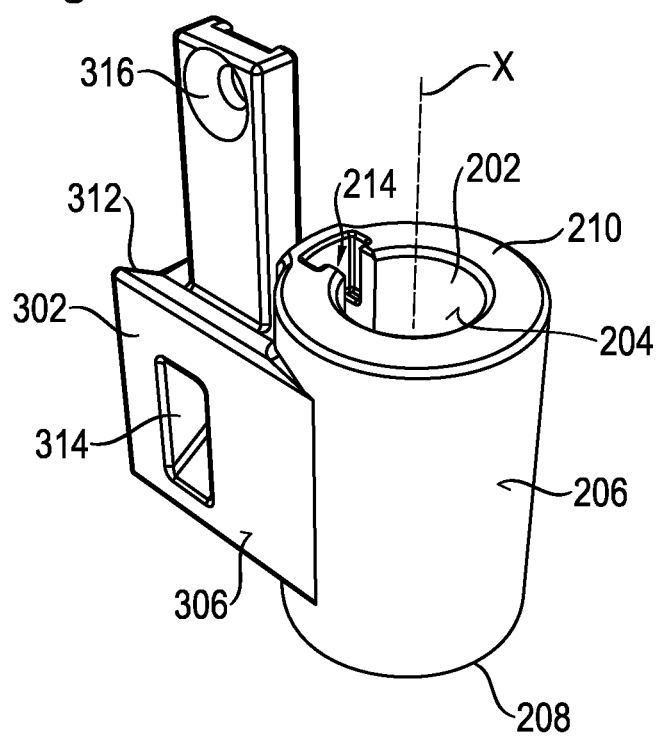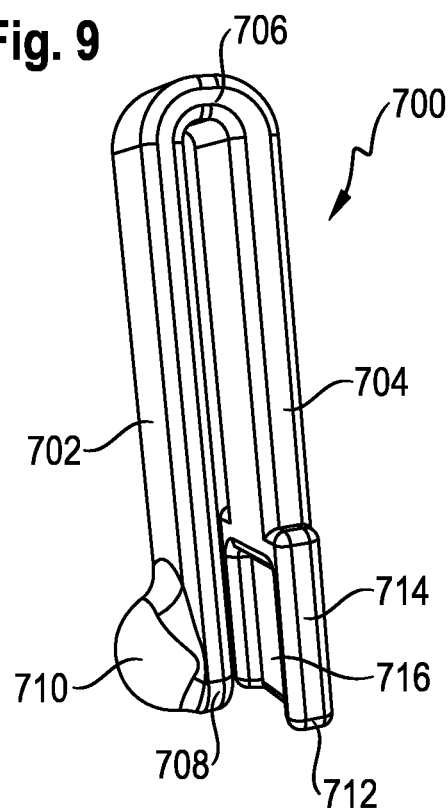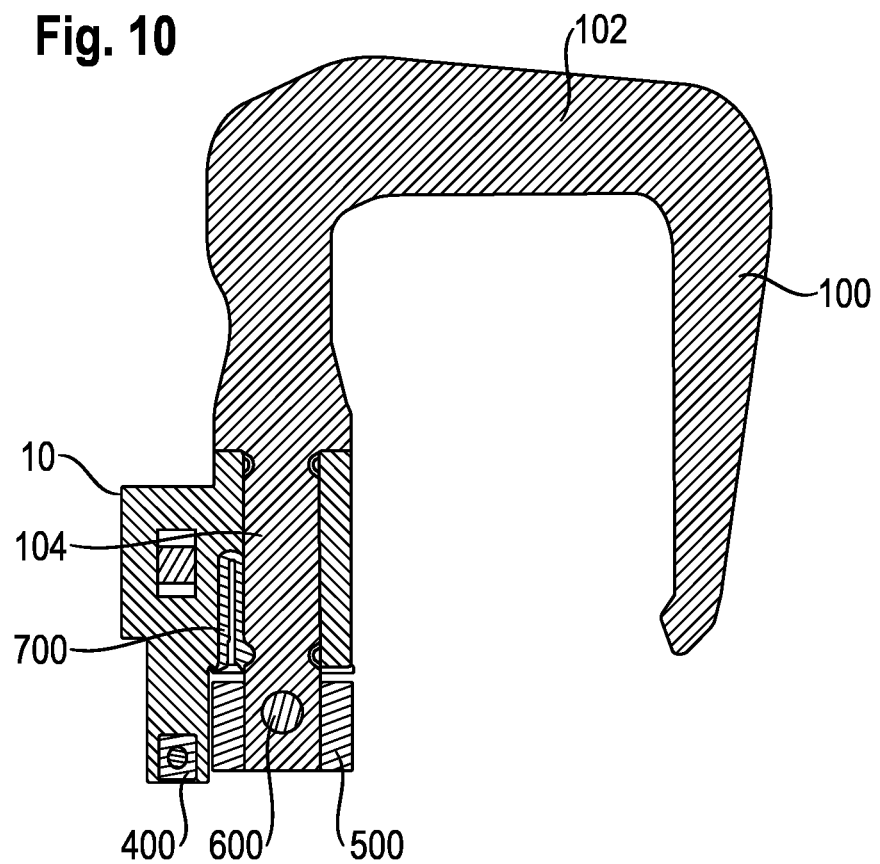

HOOK HOLDER FOR A MACHINE TOOL

The present invention relates to a holding apparatus for being detachably attached to a machine tool housing of a machine tool and for receiving a hook for hanging the machine tool from the hook.

BACKGROUND

In particular, the present invention relates to a holding apparatus for being detachably attached to a machine tool housing of a machine tool and for receiving a hook for hanging the machine tool from the hook, the holding apparatus comprising a fastening portion for fastening the holding apparatus to the machine tool housing, a securing device for securing the holding apparatus on the machine tool housing and a receiving portion which has an opening and is intended for receiving and rotatably supporting an insertion portion of the hook, the receiving portion defining an axial direction.

The machine tool housing of machine tools, such as circular saws or angle grinders, is often equipped with a hook such that it is possible to hang the machine tool from a stand or a workbench. For this purpose, the hook of a machine tool is usually held by a holding apparatus that is rigidly connected to the machine tool housing such that the hook can be pivoted between a deployed position and a retracted position. The machine tool can be held on the hook when the hook is in its deployed position and the hook rests against the machine tool housing when the hook is in its retracted position such that the hook does not hinder an operator when the machine tool is in use. The holding apparatus of the hook or the hook itself can then be damaged upon impact, for example by the machine tool being accidental dropped, such that the corresponding component has to be replaced. However, replacing the holding apparatus or the hook usually requires considerable time and effort.

SUMMARY OF THE INVENTION

It is an object of the present invention to provide a holding apparatus for being detachably attached to a machine tool housing of a machine tool and for receiving a hook for hanging the machine tool from the hook which makes it possible to replace the hook more easily and quickly, and which itself can also be replaced simply and rapidly.

The present invention provides that, in the case of the holding apparatus mentioned at the outset, the fastening portion has first interlocking connection means which are designed to engage with first mating interlocking connection means provided on the machine tool housing, the interlocking connection between the first interlocking connection means and the first mating interlocking connection means allowing movement of the holding apparatus in a sliding direction and preventing movement perpendicular to the sliding direction, and that the securing device can be moved between an open position and a locked position, the securing device being designed to prevent the holding apparatus from moving in the sliding direction in the locked position and to allow said movement in the open position.

The holding apparatus according to the present invention can thus be fastened to the machine tool housing in a secure manner, but such that it can be quickly detached. In order for the holding apparatus to be interlockingly coupled to the machine tool housing, the holding apparatus and the machine tool housing are shaped such that the holding apparatus can be pushed into the machine tool housing or pushed onto the machine tool housing in the sliding direction. The machine tool housing can have, for example, a groove provided for receiving the holding apparatus. By moving the holding apparatus counter to the insertion direction, the holding apparatus can also be separated again from the machine tool housing. In order to prevent the holding apparatus coupled to the machine tool housing from detaching from the machine tool housing again when the machine tool is in use, a securing device is provided on the holding apparatus, which device can block movement of the holding apparatus counter to the sliding direction. More specifically, the holding apparatus coupled to the machine tool housing is fastened to the machine tool housing by means of the securing device when the securing device is in its locked position, and is released in the open position for movement in the sliding direction.

The sliding direction of the holding apparatus is defined by the first interlocking connection means of the holding apparatus and the first mating interlocking connection means of the machine tool housing. The first interlocking connection means of the holding apparatus and the first mating interlocking connection means of the machine tool housing preferably together form a linear sliding guide. In general, the first interlocking connection means or the first mating interlocking connection means can have an undercut, for example a dovetail-shaped undercut, in order to prevent the holding apparatus coupled to the machine tool housing from moving perpendicularly to the sliding direction.

The sliding direction can extend substantially perpendicularly to the axial direction defined by the receiving portion. Furthermore, the fastening portion can be arranged next to the receiving portion, e.g. as viewed in the sliding direction.

In a preferred embodiment, the fastening portion comprises a through-opening and the securing device comprises an actuation element. The actuation element can have a first end and a first end portion extending from the first end, and a second end and a second end portion extending from the second end. The first end portion of the actuation element can be rigidly coupled to the holding apparatus, in particular the fastening portion.

The fastening portion can comprise a coupling part having the first interlocking connection means, and an arm projecting from the coupling part. The first end portion of the actuation element can preferably be rigidly coupled to the arm. It is also preferable for the arm to be arranged on the coupling part so as to be movable or resilient relative to the coupling part. The coupling part can also comprise the through-opening in the actuation element.

In the case of a dovetail joint between the holding apparatus and the machine tool housing, at least one region of the coupling part of the fastening portion can have a trapezoidal cross section and have a flat upper face, a flat lower face and a side wall connecting the upper face to the lower face, the side wall of the coupling part comprising or forming the first interlocking connection means at least in portions on opposite sides. The coupling part can be received in a groove provided in the machine tool housing and having a trapezoidal cross section, the peripheral wall of which groove forms or comprises the second interlocking connection means at least in portions on opposite sides.

The second end portion of the actuation element can be designed to project into the through-opening in the fastening portion. In particular, the second end of the actuation element can protrude beyond the fastening portion when the securing device is in its locked position and be arranged within the through-opening in the fastening portion when the securing device is in its open position.

The present invention also relates to a holding system comprising the above-described holding apparatus and a hook having an insertion portion, it being possible for the insertion portion of the hook to be introduced into the receiving portion of the holding apparatus.

The holding system can further comprise a first latching device which interacts with the receiving portion of the holding apparatus and is intended for defining a rotational position of the hook relative to the holding apparatus. The first latching device is preferably designed such that it can be coupled to the insertion portion of the hook for rotation therewith. For example, the first latching device can have a sleeve-shaped main body which can be pushed onto the insertion portion of the hook. So as to axially and radially fasten the main body to the hook, the main body can have two radially opposite holes and the hook can have a bore which extends radially through the insertion portion and into which a pin can be introduced. By removing the pin, the hook can be easily and quickly pulled out of the receiving portion of the holding apparatus.

In a preferred embodiment, the first latching device comprises at least one spring arrangement and the receiving portion comprises at least one depression, the at least one spring arrangement being designed to engage with the at least one depression in the receiving portion.

If the first latching device comprises a sleeve-shaped main body, the main body can have at least one resilient portion, which can be formed by omitting main body material when the main body is being produced or by removing main body material after the main body has been produced. The at least one resilient portion preferably forms the at least one spring arrangement of the first latching device.

The main body can also comprise in each case a slot for a spring arrangement. The at least one spring arrangement can be formed integrally with the sleeve-shaped main body, but can also be introduced into a corresponding. The at least one spring arrangement can be pivotably formed on a side of the corresponding slot in the sleeve-shaped main body that extends in the axial direction or in the peripheral direction such that the spring arrangement can be moved relative to the side of the slot that is opposite said side. The at least one spring arrangement can, for example, have a strip-type or wire-type structure, which can be labyrinthic, serpentine, rectangular or of some other curved shape.

Each spring arrangement is arranged in the sleeve-shaped main body such that the spring arrangement projects beyond the main body in order to be able to engage in the at least one depression in the receiving portion. So as to engage in the at least one depression in the receiving portion, the at least one spring arrangement can have a corresponding interlocking connection means, e.g. in the form of a latching lug.

In order for the first latching device to be evenly supported on the receiving portion, the first latching device preferably has exactly two radially opposite spring arrangements. In this case, the receiving portion has at least two depressions or another even number of depressions. When there are a plurality of spring arrangements, these are preferably distributed symmetrically around a peripheral wall of the main body of the first latching device. An asymmetrical distribution is of course also possible. The spring arrangements of the first latching device are preferably identical in design.

The holding system can further comprise at least one second latching device which interacts with the insertion portion of the hook and comprises second interlocking connection means for defining a rotational position of the hook relative to the holding apparatus. For this purpose, the receiving portion of the holding apparatus can have at least one depression which extends axially along an inner surface of the opening in the receiving portion, and into which the at least one second latching device can be introduced. The at least one second latching device can be designed such that the second interlocking connection means can be brought into engagement with second mating interlocking connection means provided on an outer face of the insertion portion of the hook.

In a preferred embodiment, the at least one second latching device has a first leg and a second leg, which are interconnected at one of their ends via a connecting portion. A free end of the first leg that is opposite the connecting portion can comprise the second interlocking connection means. For example, the second interlocking connection means can be a semi-spherical raised portion of the first leg and the second mating interlocking connection means of the hook can be semi-circular depressions in the insertion portion of the hook that are shaped so as to be complementary to the second interlocking connection means. The first leg and the second leg of the second latching device are preferably movable relative to one another perpendicularly to their extension direction. In other words, the second latching device is preferably resilient.

The present invention also relates to a machine tool comprising the above-described holding system. The components of the holding system can be made of plastics material, preferably polyamide.

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

BRIEF DESCRIPTION OF THE DRAWINGS

In the drawings, identical and equivalent components are provided with the same reference signs.

In the drawings:

FIG. 8 shows a holding apparatus according to a second embodiment of the present invention without the securing device;

FIG. 9 shows a second latching device for use with the holding apparatus from FIG. 8;

FIG. 10 is a sectional view through a holding apparatus comprising a second latching device.

DETAILED DESCRIPTION

Figure 1:
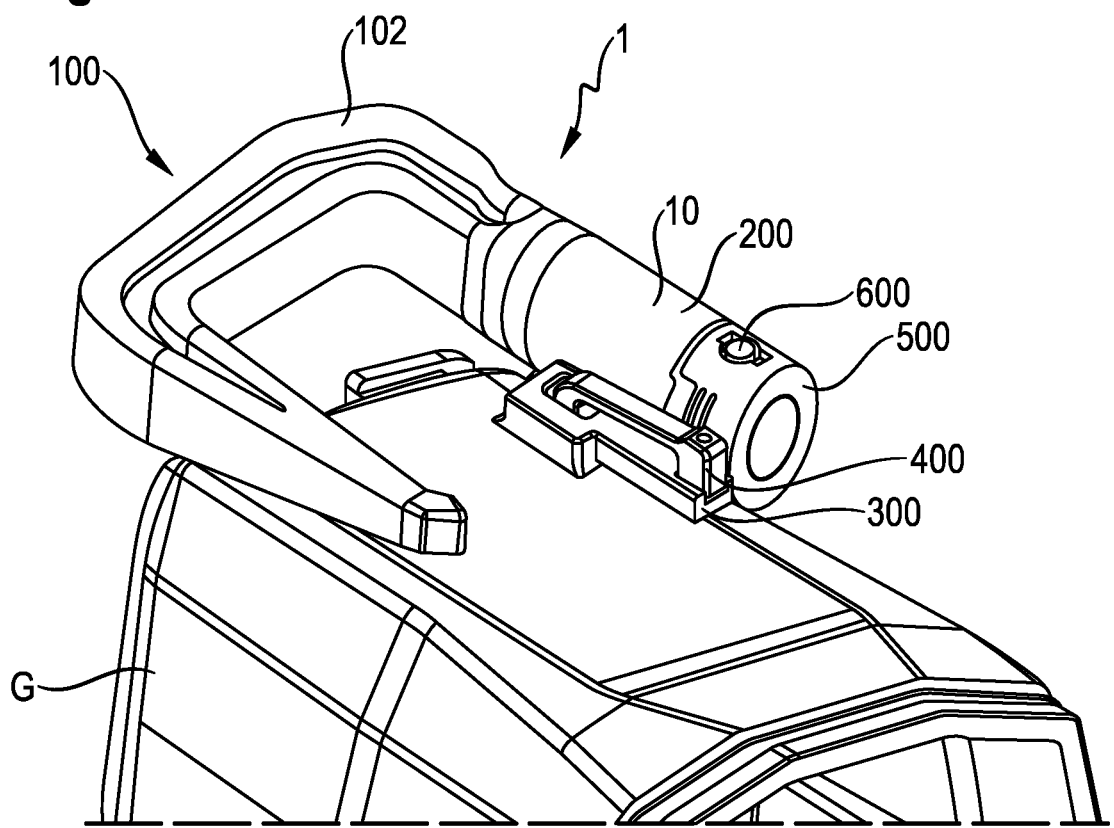
FIG. 1 is a view of a holding system according to the present invention that is fastened to a machine tool housing.
Figure 4:
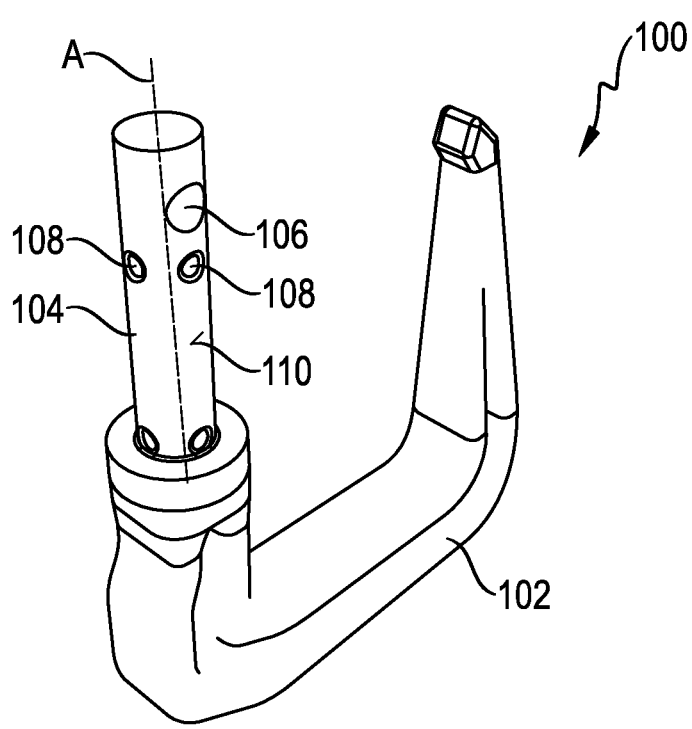
FIG. 4 shows a hook for introduction into the holding apparatus from FIG. 1.

FIG. 1 shows a holding system 1 that is fastened to a machine tool housing G of a machine tool and comprises a holding apparatus 10 according to the present invention. The holding system 1 or the holding apparatus 10 is used to hold a hook 100 comprising a U-shaped holding portion 102 and a cylindrical insertion portion 104 (FIG. 4). The machine tool can be, for example, a circular saw or an angle grinder.

Figure 2A:
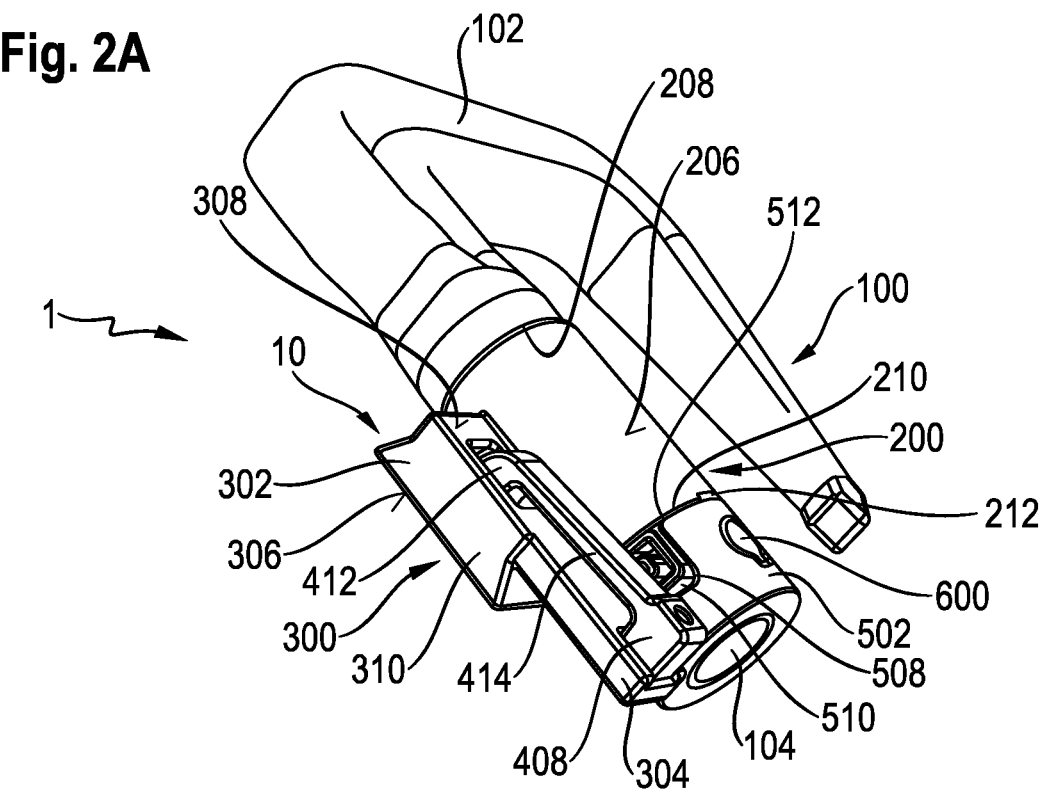
FIG. 2A shows the holding system from FIG. 1 with a hook rotated by 180° with respect to the position in FIG. 1.

FIG. 2A/B/C are different views of the holding system 1 according to the invention.

Figure 3:
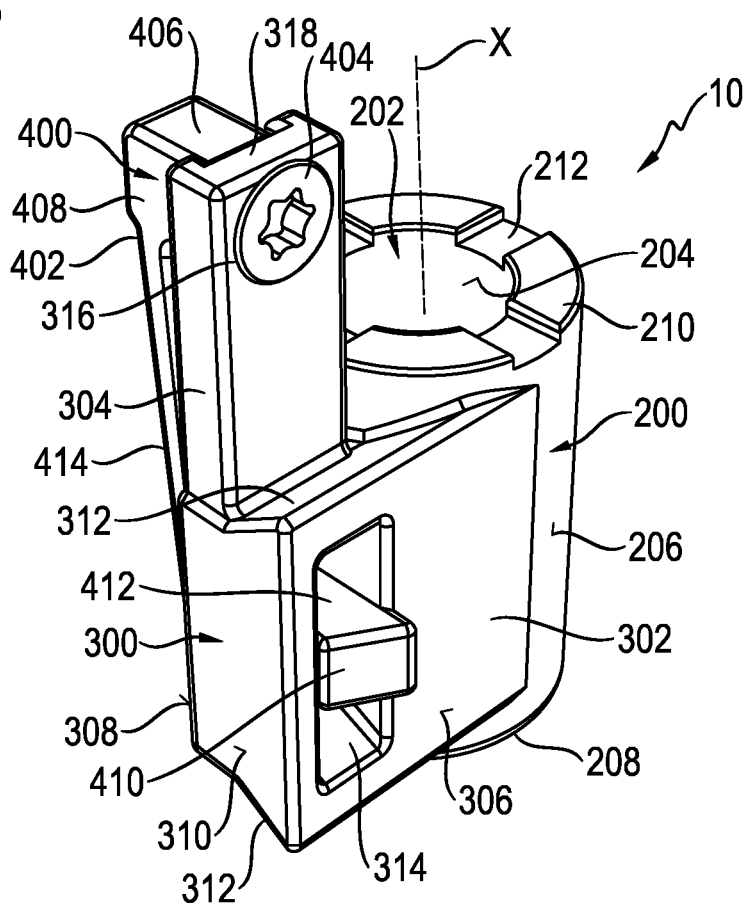
FIG. 3 shows the holding apparatus from FIG. 1.

FIG. 3 shows the holding apparatus 10 according to the invention. The holding apparatus 10 comprises a receiving portion 200, a fastening portion 300 and a securing device 400.

The receiving portion 200 is in the shape of a hollow cylinder comprising an opening 202 and defines an inner surface 204 and an outer surface 206. The opening 202 extends in an axial direction X through the entire receiving portion 200 and is provided so as to receive the insertion portion 104 of the hook 100. Furthermore, the receiving portion 200 defines a first end 208 and a second end 210 that is opposite the first end 208 in the axial direction X. The insertion portion 104 of the hook 100 is inserted into the opening 202 from the first end 208 of the receiving portion 200. When inserted in the receiving portion 200, the insertion portion 104 is concentric to the receiving portion 200. A longitudinal axis A of the insertion portion 104 is thus parallel to the axial direction X.

The fastening portion 300 has a substantially rectangular coupling part 302 and an arm 304 which projects from the coupling part 302 in the axial direction X. The coupling part 302 is formed on the receiving portion 200 on the outer surface 206 thereof. In the embodiment shown, the coupling part 302 and the receiving portion 200 are formed in one piece with one another, as are the coupling part 302 and the arm 304; however, they can of course also be connected or connectable in other ways.

The coupling part 302 has a flat lower face 306, a flat upper face 308 parallel to the lower face 306 and a side wall 310 connecting the lower face 306 and the flat upper face 308 to one another. A lower region of the coupling part 302 has a trapezoidal cross section with respect to a section perpendicular to the lower face 306 and parallel to the axial direction X. Here, the opposite sides of the side wall 310 that extend substantially perpendicularly to the axial direction X form an acute angle together with the lower face 306. These portions of the side wall 310 form first interlocking connection means 312.

Figure 5:
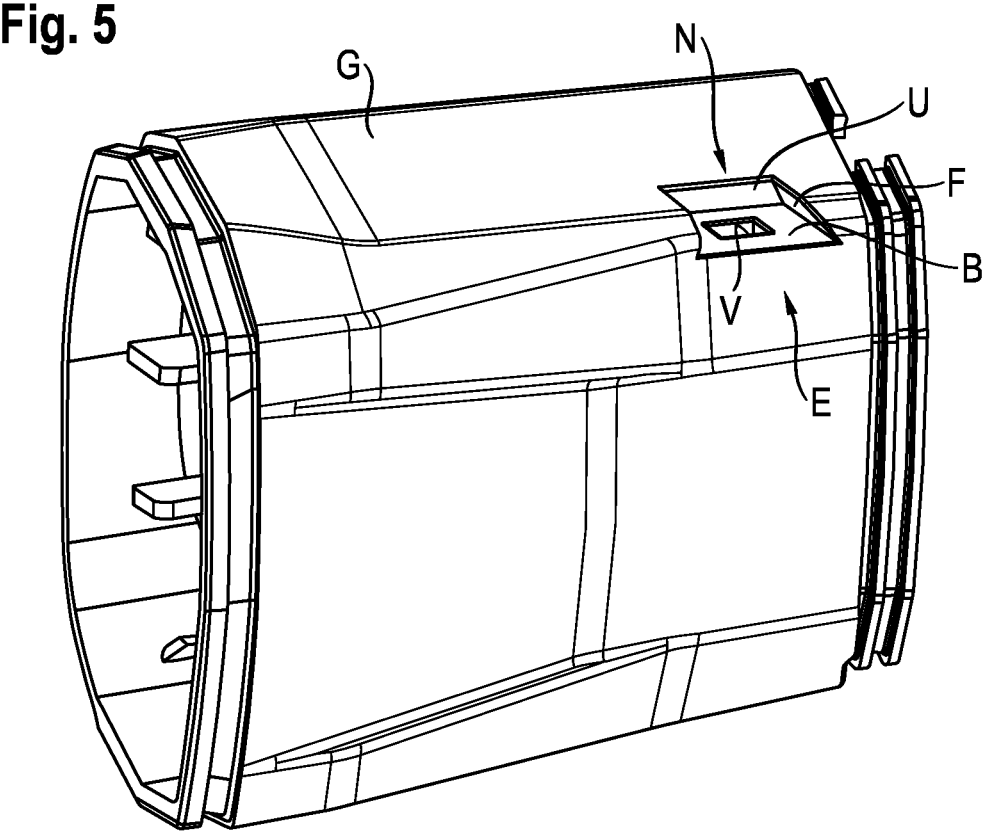
FIG. 5 shows a machine tool housing for the holding apparatus from FIG. 1.

As shown in FIG. 5, the machine tool housing G of a machine tool comprises a groove N having a bottom surface B and a peripheral wall U. A depression V is provided in the bottom surface B of the groove N. The peripheral wall U of the groove N is shaped so as to be complementary to the first interlocking connection means 312 of the coupling part 302 and thus forms, at least in portions, first mating interlocking connection means F of the machine tool housing G. In this way, a sliding direction E is defined, in which the holding apparatus 10 is pushed into the groove N in the machine tool housing G. The sliding direction E extends substantially perpendicularly to the axial direction X. If the coupling part 302 is received in the groove N, the lower face 306 of the coupling part 302 rests against the bottom surface B of the groove N.

The coupling part 302 also has a through-opening 314 which interacts with the securing device 400. The through-opening 314 extends substantially perpendicularly to the axial direction X and the sliding direction E.

The arm 304 projects from the coupling part 302 in the axial direction X. In the embodiment shown, the arm 304 projects beyond the second end 210 of the receiving portion 200. In relation to a direction perpendicular to the lower face 306 of the coupling part 302, the arm 302 is spaced apart from the lower face 306 of the coupling part 302. This attachment of the arm 304 to the coupling part 302 allows the arm 304 to pivot relative to the coupling part 302, the corresponding pivot axis extending perpendicularly to the axial direction X and in parallel with the lower face 306 of the coupling part 302.

The securing device 400 comprises an actuation element 402 and a connecting means in the form of a screw 404. The actuation element 402 is substantially U-shaped with a first end 406 and a first end portion 408 adjacent thereto, a second end 410 and a wedge-shaped second end portion 412 adjacent thereto, and an elongate central connecting piece 414 which connects the first end portion 408 to the second end portion 412.

Figure 2B:
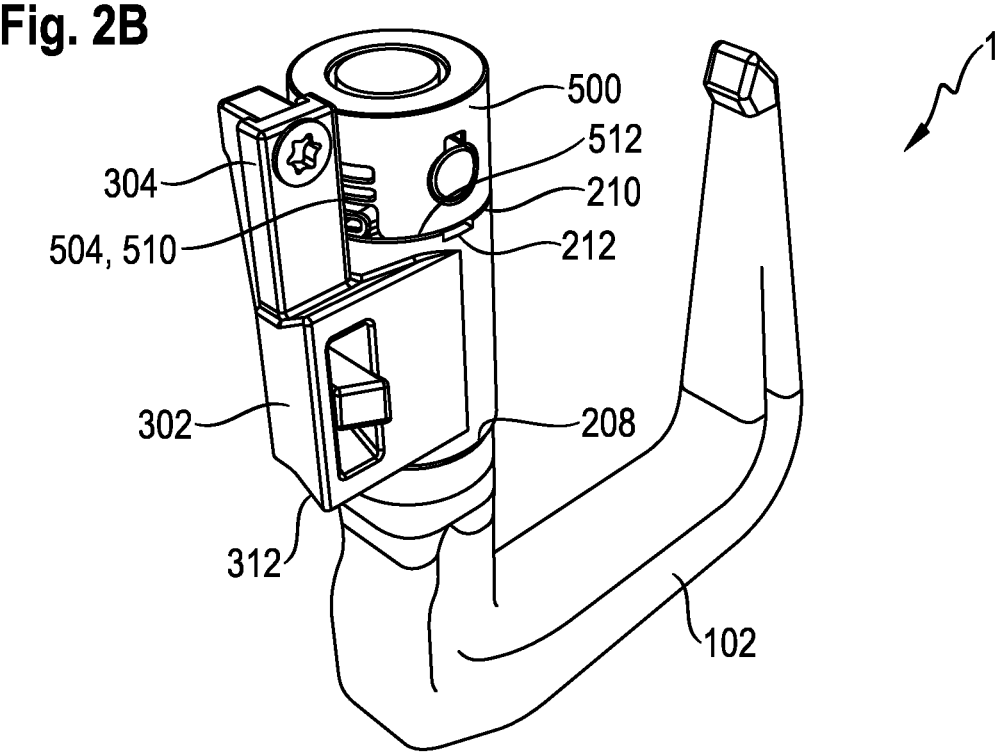
FIG. 2B shows the holding system from FIG. 1 at an angle from below and with a hook rotated by 180° with respect to the position in FIG. 1.
Figure 2C:
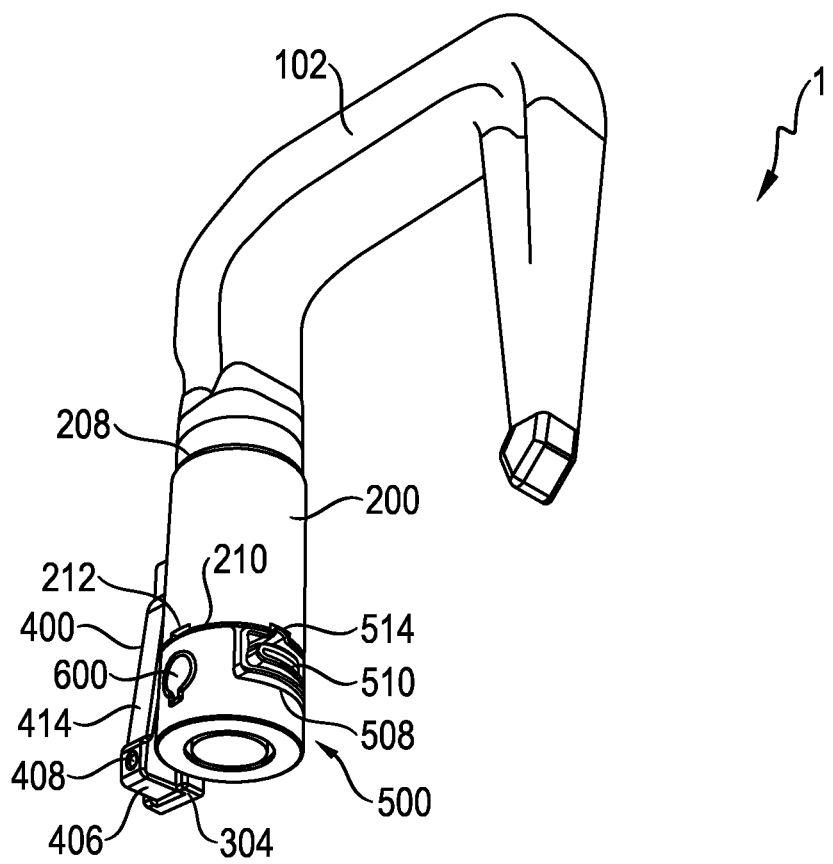
FIG. 2C shows the holding system from FIG. 1 in a side view and with a hook rotated by 180° with respect to the position in FIG. 1.

As shown particularly well in FIGS. 2B and 3, the actuation element 402 is connected to the arm 304 by the screw 404 extending through a hole 316 (FIG. 8) at the free end 318 of the arm 304 and being screwed to the actuation element 402. Of course, other types of connection can also be used instead of a screw connection. Furthermore, the securing device 400 and the actuation element 402 can also be formed in one piece with the fastening portion 300 and the arm 304.

When the securing device 400 is mounted on the fastening portion 300, the central connecting piece 414 of the actuation element 402 extends in the axial direction X. If the securing device 400 is not actuated, the securing device 400 is in the locked position. In this case, the second end portion 412 of the actuation element 402 enters the through-opening 314 in the coupling part 302 and projects beyond the lower face 306 of the coupling part 302 such that the second end portion 412 is engaged with the depression V in the machine tool housing G. The second end portion 412 of the actuation element 402 thus has a length that is greater than the distance between the lower face 306 and the upper face 308 of the coupling part 302.

By actuating the actuation element 402, for example by lifting the actuation element 402 in the region of the second end portion 412 or by pressing down on the actuation element 402 together with the arm 304 in the region of the first end portion 408, the securing device 400 can be moved into the open position such that the second end portion 412 of the actuation element 402 is lifted and brought out of the depression V in the machine tool housing G. If the action on the actuation element 402 is ended, the securing device 400 moves back into the locked position.

Figure 6:
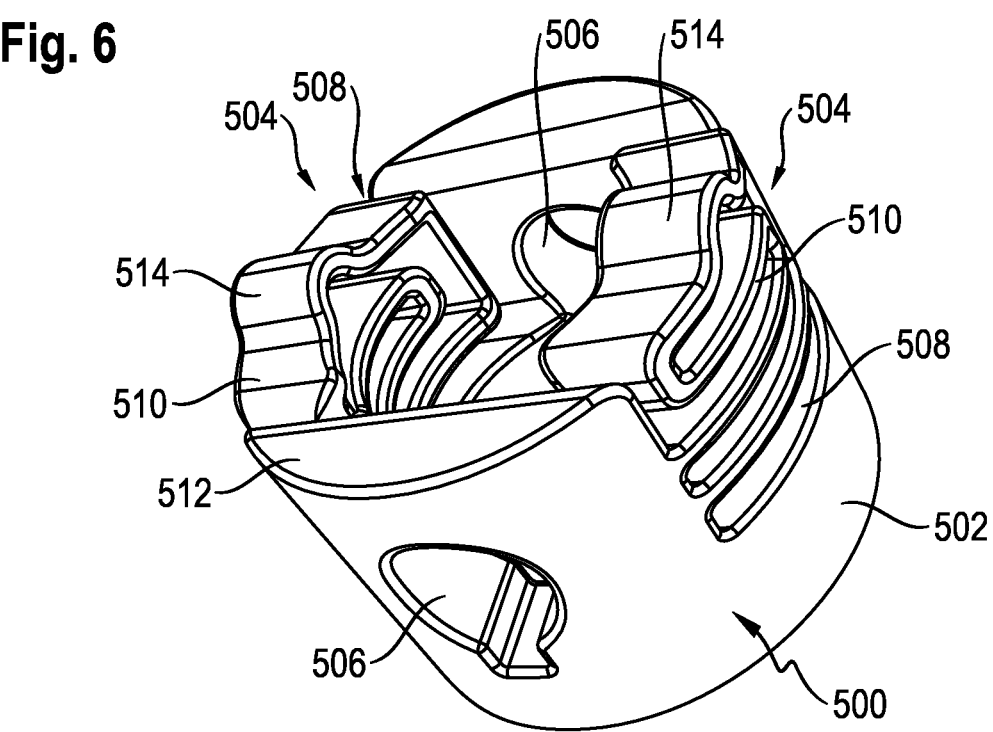
FIG. 6 shows a first latching device comprising two spring arrangements for a holding system according to the present invention.
Figure 7A:
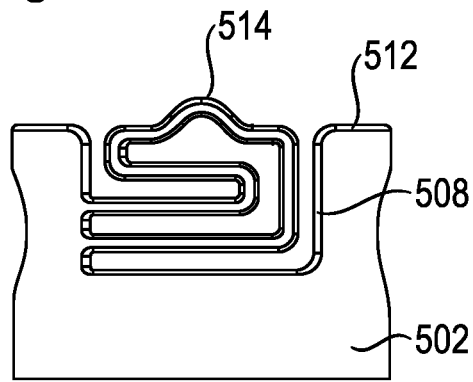
FIG. 7A-F show various embodiments of a spring arrangement of the first latching device from FIG. 6.
Figure 7B:
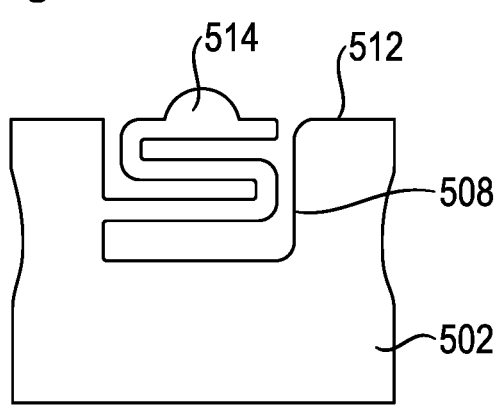
Figure 7C:
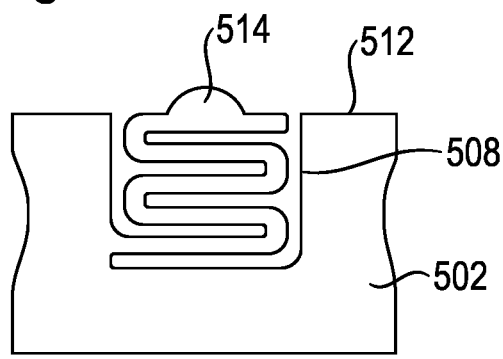
Figure 7D:
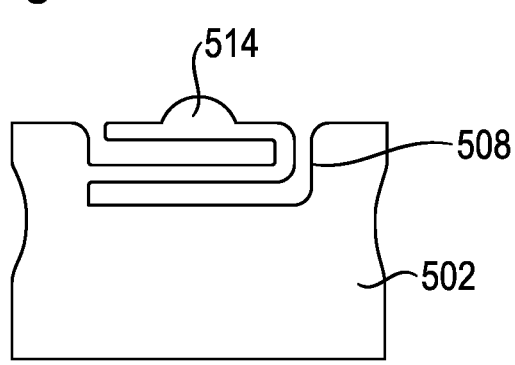
Figure 7E:
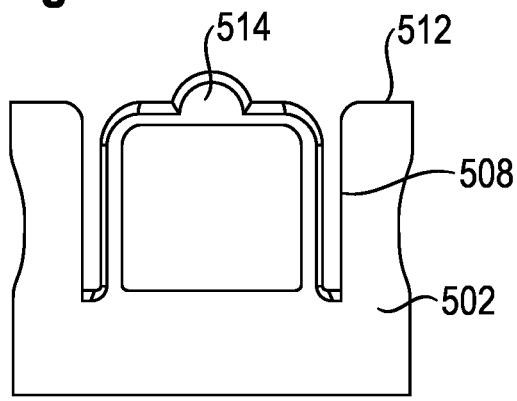
Figure 7F:
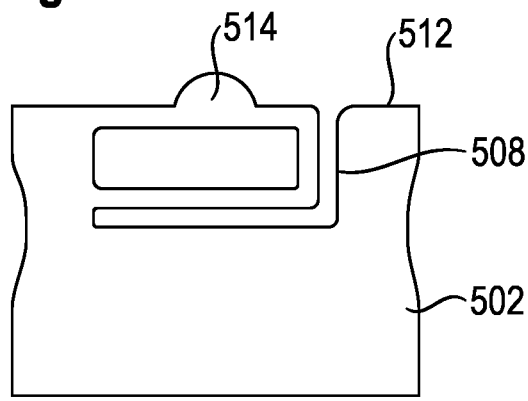

The holding system 1 shown in FIG. 2A/B/C also comprises a first latching device 500. The first latching device 500 is shown in FIG. 6 and said latching device 500 comprises a sleeve-shaped main body 502 comprising two resilient portions 504.

The hook 100 is prevented from sliding out of the receiving portion 200 by the first latching device 500 being pushed onto the insertion portion 104 of the hook 100 and secured by means of a pin 600 that extends radially through the first latching device 500 and the insertion portion 104. For this purpose, the insertion portion 104 has a radial bore 106 and the main body 502 has two radially opposite holes 506 into which the pin 600 can be inserted.

The resilient portions 504 of the main body 502 are formed by the main body 502 having on each radially opposite side a slot 508 comprising a spring arrangement 510 arranged therein. The two spring arrangements 510 protrude beyond an edge 512 of the main body 502 that is opposite the second end 210 of the receiving portion 200 in the axial direction X. The two spring arrangements 510 shown in FIG. 6 have a meandering strip-type structure.

A spring arrangement 510 for the first latching device 500 can be of a different design, but it is preferable for all spring arrangements 510 of a first latching device 500 to have the same shape. Various shapes of a spring arrangement 510 are shown by way of example in FIG. 7A to 7F. In the examples from FIG. 7A to 7F, the spring arrangements 510 are always formed in one piece with the main body 502. In addition, the spring arrangements 510 shown each have a latching lug 514. However, the design of the spring arrangements 510 is not limited to these examples.

As can be seen from FIG. 3, a plurality of recesses 212 are provided at the second end 210 of the receiving portion 200, in which the two spring arrangements 510, in particular the latching lugs 514, can engage. The second end 210 of the receiving portion 200 can comprise, for example, four or eight recesses 212 arranged symmetrically around the opening 202 in the receiving portion 200.

If the hook 100 introduced in the receiving portion 200 is rotated about the longitudinal axis A, the first latching device 500 accordingly rotates therewith due to the coupling between the hook 100 and the first latching device 500 brought about by the pin 600. In this way, the two spring arrangements 510 can be disengaged from the recesses 212 at the second end 210 of the receiving portion 200 and pressed into their respective slots 508 by the edge 512 of the main body 502. If the two spring arrangements 510 continue to rotate as far as a subsequent recess 212, the tension is released from the two spring arrangements 510 and they enter the recesses 212, as a result of which a rotational position of the hook 100 is defined.

The additional force required to pass over a recess 212 is visible to an operator. With the hook 100 in a desired rotational position relative to the holding apparatus 10, the operator can let go of the hook 100 and the hook 100 is held in the set rotational position by the interaction between the recesses 212 and the two spring arrangements 510.

As can be seen from FIG. 8, the receiving portion 200 can also be provided with at least one depression 214 that extends in the axial direction X and is open toward the inner surface 204 of the opening 202 in the receiving portion 200. A second latching device 700 shown in FIG. 9 can be introduced into the depression 214. For the sake of clarity, the holding apparatus 10 is shown in FIG. 8 without the securing device 400. The receiving portion 200 can also comprise two or more depressions 214 of this kind, in each of which a second latching device 700 can be received.

The second latching device 700 is fork-shaped and has a first leg 702 and a second leg 704, which are interconnected at one of their ends via a connecting portion 706. The distance between the opposing first and second legs 702, 704 is on the order of the thickness of one of the two legs 702, 704, the thickness of the first and second leg 702, 704 being substantially equal in the embodiment shown.

Second interlocking connection means 710 in the form of a semi-spherical raised portion are located at the free end 708 of the first leg 702 that is opposite the connecting portion 706. At the free end 712 of the second leg 704 that is opposite the connecting portion 706, the second leg 704 has a portion 714 that is widened by comparison with the rest of the second leg 704 and comprises a depression 716 which the free end 708 of the first leg 702 can enter when the two legs 702, 704 are moved toward one another, e.g. by the free end 708 of the first leg 702 being pressed onto the free end 712 of the second leg 704. FIG. 10 is a sectional view through the holding apparatus 10 comprising the second latching device 700 introduced into the depression 214 in the receiving portion 200.

The second interlocking connection means 710 are provided so as to engage in second mating interlocking connection means 108 shaped so as to be complementary to the second interlocking connection means 710, i.e. in semi-circular depressions in the outer surface 110 of the insertion portion 104 of the hook 100, when the insertion portion 104 of the hook 100 is in the opening 202 in the receiving portion 200. The second mating interlocking connection means 108 extend in a circle around the insertion portion 104 of the hook 100 and each determine a rotational position of the hook 100 relative to the holding apparatus 10. The number of second mating interlocking connection means 108 and the distance between directly adjacent second mating interlocking connection means 108 can be adapted to the desired rotational positions of the hook 100. For example, four second mating interlocking connection means 108 can be equidistantly arranged in a circle around the insertion portion 104.

The second latching device 700 is secured against movement in the axial direction X out of the depression 214 by means of the first latching device 500.

LIST OF REFERENCE SIGNS

A longitudinal axis
B bottom surface
E sliding direction
F first mating interlocking connection means, i.e. first mating interlocking connector
G machine tool housing
N groove
U peripheral wall
depression
X axial direction
holding system
holding apparatus
100 hook
102 holding portion
104 insertion portion
106 radial bore
108 second mating interlocking connection means, i.e. second mating interlocking connector
110 outer surface
200 receiving portion
202 opening
204 inner surface
206 outer surface
208 first end
210 second end
212 recesses
214 depression
300 fastening portion
302 coupling part
304 arm
306 lower face
308 upper face
310 side wall 312 first interlocking connection means, i.e. first interlocking connector
314 through-opening
316 hole
318 free end
400 securing device
402 actuation element
404 screw
406 first end
408 first end portion
410 second end
412 second end portion
414 central connecting piece
500 first latching device
502 main body
504 resilient portions
506 holes
508 slot
510 spring arrangement
512 edge
514 latching lug
600 pin
700 second latching device
702 first leg
704 second leg
706 connecting portion
708 free end
710 second interlocking connection means/raised portion, i.e. second interlocking connector
712 free end
714 widened portion
716 depression

What is claimed is:

1. A holding apparatus for being detachably attached to a machine tool housing of a machine tool and for receiving a hook for hanging the machine tool from the hook, the holding apparatus comprising:
a fastening portion for fastening the holding apparatus to the machine tool housing;
a securing device for securing the holding apparatus on the machine tool housing; and
a receiving portion having an opening and being intended for receiving and rotatably supporting an insertion portion of the hook, the receiving portion defining an axial direction;
the fastening portion having a first interlocking connector designed to engage with first mating interlocking connector provided on the machine tool housing, an interlocking connection between the first interlocking connector and the first mating interlocking connector allowing movement of the holding apparatus in a sliding direction and preventing movement perpendicular to the sliding direction, the securing device being movable between an open position and a locked position, the securing device being designed to prevent the holding apparatus from moving in the sliding direction in the locked position and to allow movement in the sliding direction in the open position.

2. The holding apparatus as recited in claim 1 wherein the first interlocking connector and the first mating interlocking connector form a dovetail joint.

3. The holding apparatus as recited in claim 1 wherein the fastening portion includes a through-opening and the securing device includes an actuator having a first end and a first end portion extending from the first end and a second end and a second end portion extending from the second end, the first end portion being rigidly couplable to the holding apparatus and the second end portion being designed to project into the through-opening in the fastening portion, the second end protruding beyond the fastening portion when the securing device is in the locked position and being arranged within the through-opening in the fastening portion when the securing device is in the open position.

4. The holding apparatus as recited in claim 3 wherein the fastening portion includes a coupling part having the first interlocking connector and an arm projecting from the coupling part, the first end portion being rigidly connectable to the arm.

5. A holding system for holding a machine tool, the holding system comprising:
the holding apparatus as recited in claim 1 and the hook having the insertion portion, the insertion portion of the hook being introducible into the receiving portion of the holding apparatus.

6. The holding system as recited in claim 5 further comprising a first latch interacting with the receiving portion of the holding apparatus and intended for defining a rotational position of the hook relative to the holding apparatus, the first latch being couplable to the insertion portion of the hook for rotation therewith.

7. The holding system as recited in claim 6 wherein the first latch includes at least one spring arrangement and the receiving portion includes at least one depression, the at least one spring arrangement being designed to engage with the at least one depression in the receiving portion.

8. The holding system as recited in claim 5 further comprising at least one second latch interacting with the insertion portion of the hook and including a second interlocking connector for defining a rotational position of the hook relative to the holding apparatus and the receiving portion of the holding apparatus having at least one depression extending axially along an inner surface of the opening in the receiving portion, and into which the at least one second latch can be introduced such that the second interlocking connector of the at least one second latch can be brought into engagement with second mating interlocking connector provided on an outer face of the insertion portion of the hook introduced in the receiving portion.

9. The holding system as recited in claim 8 wherein the at least one second latch has a first leg and a second leg interconnected at one of their ends via a connecting portion, a free end of the first leg opposite the connecting portion including the second interlocking connector.

10. A machine tool comprising: the holding system as recited in claim 5.

* * * * *